United States Patent [19]
Orvis

[11] Patent Number: 5,580,210
[45] Date of Patent: Dec. 3, 1996

[54] SEAT HANDLING DEVICE

[76] Inventor: Everett E. Orvis, 5253 Clyde Rd., Howell, Mich. 48843

[21] Appl. No.: 494,781

[22] Filed: Jun. 26, 1995

[51] Int. Cl.$^6$ ..................................................... B25J 1/00
[52] U.S. Cl. ........................... 414/758; 414/741; 414/783; 269/71
[58] Field of Search ..................................... 414/758, 783, 414/741; 269/25, 26, 71; 294/86.41, 119.1

[56]  References Cited

U.S. PATENT DOCUMENTS

| | | |
|---|---|---|
| Re. 32,532 | 10/1987 | Sonerud . |
| 2,925,300 | 2/1960 | Kelley . |
| 4,116,349 | 9/1978 | Durham . |
| 4,238,169 | 12/1980 | Depriester et al. ...................... 414/783 |
| 4,336,926 | 6/1982 | Inagaki et al. .......................... 414/741 |
| 4,600,350 | 7/1986 | Matthewson et al. .................. 414/783 |
| 4,797,059 | 1/1989 | Karg et al. . |
| 4,921,389 | 5/1990 | O'Daniel . |
| 5,205,699 | 4/1993 | Habicht . |

*Primary Examiner*—Karen Merritt
*Assistant Examiner*—Douglas Hess
*Attorney, Agent, or Firm*—Remy J. VanOphem; Thomas A. Meehan; John VanOphem

[57]  ABSTRACT

A device for handling an automobile seat having a bar suspended from a cable and a rotor connected to the bottom end of the bar with the output shaft of the rotor used to rotate a clamp-like device. The clamp-like device has a pair of blades which are moved together and apart using piston-cylinders. The blades have a first portion and an angularly offset second portion specifically designed to be utilized for handling an automobile seat without damage to the seat.

6 Claims, 2 Drawing Sheets

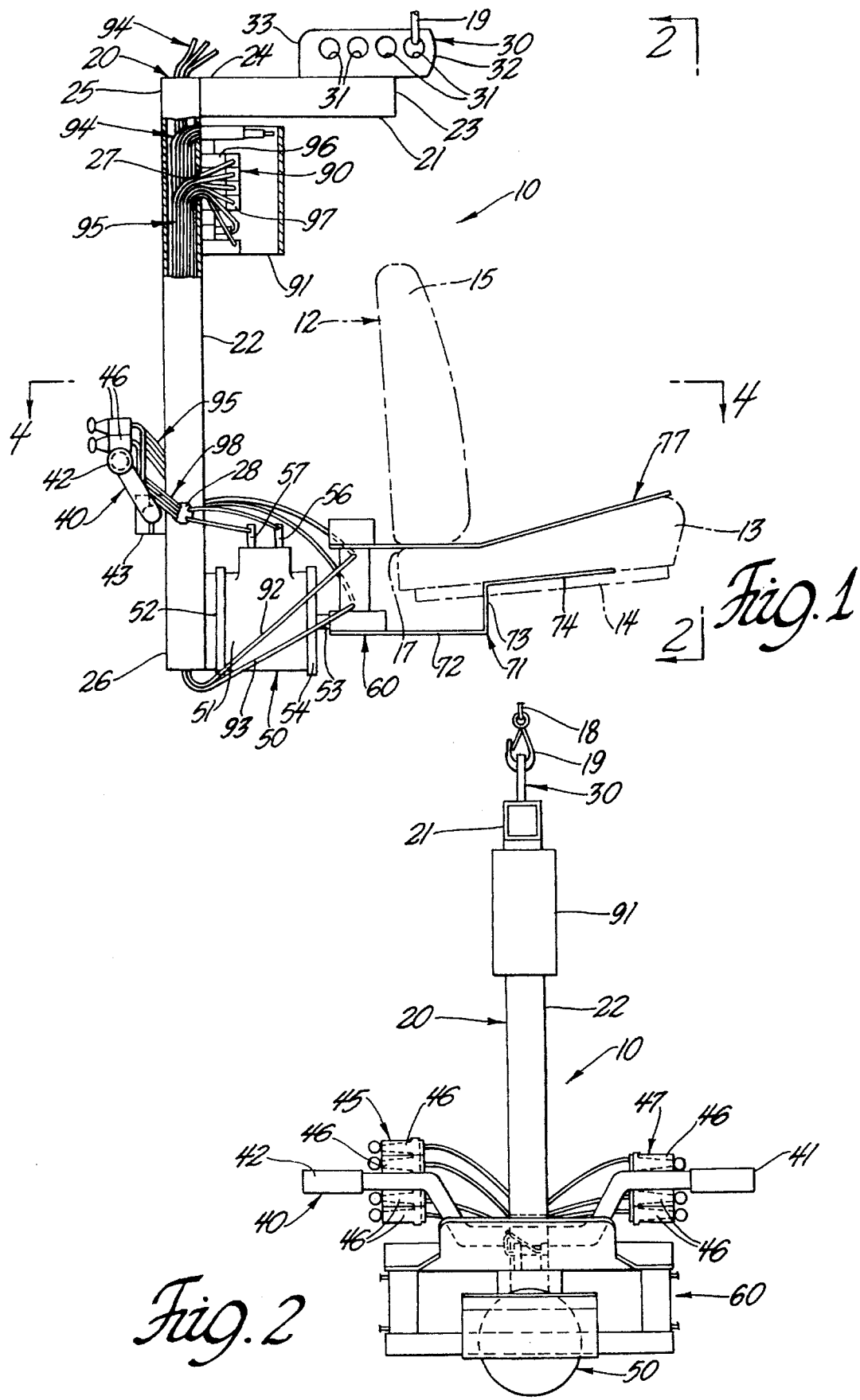

SEAT HANDLING DEVICE

BACKGROUND OF THE INVENTION

1. Field of the Invention

The present invention relates to devices utilized for handling and manipulating a workpiece. More particularly, the present invention relates to a device for handling and manipulating a seat, such as a seat for an automobile or similar device. The present invention is utilized to assist an operator to pick-up, turn-over and move a seat thereby preventing the operator from having to do the same on a repetitive basis. Such a device helps to prevent injuries, in particular back injuries, typically suffered by the operator.

2. Description of the Prior Art

It is well known in the seat manufacturing industry, and in particular in the automotive seat manufacturing industry, to assemble seats of different styles, sizes and types on the same assembly line. Additionally, it is well known to manufacture the seats in an upside-down manner so that the bottom of the seat is facing upward and is more easily accessed by a worker. This makes it easier for the worker to assemble a multitude of components, such as seat adjusters, motors, rails, latch mechanisms, seat belt assemblies, etc. to the seat. However, this upside down technique requires the worker to lift and flip-over the seat in order to properly place it on a pallet for boxing and shipping. Since such seats can weigh upwards of one to two hundred pounds and thousands of seats are built every day, such repetitive heavy lifting can result in significant injuries to the workers. Accordingly, it would be very beneficial to provide such workers with a better way of avoiding such repetitive lifting.

It is well known to utilize machines to help humans in lifting and manipulating heavy objects in order to prevent injuries and to help make workers more efficient. While the cost of such machines can be quite expensive, the savings due to fewer injuries and increased efficiency more than makes up for increased cost. Examples of devices which have been designed to address specific situations are common.

For example, U.S. Pat. No. 2,925,300, to Kelley, discloses a material handling device for handling coils of metal. The device of Kelley is essentially a clamping mechanism which is connected to a vertical support member having its upper end connected to and depending from a track for moving the entire metal coil handling device. The Kelley reference further includes a screw and hand wheel combination for moving the jaws of the clamp into and out of engagement with the metal coil to be handled. This combination is clearly very slow and inefficient in operation. Kelley also discloses the use of an electric motor for moving a balance member along a shaft located in the body of the handling device for altering the balance of the device to counteract the load being carried to establish a completely balanced system.

Other material handling devices have been suggested, such as the pipe laying appliance of U.S. Pat. No. Re. 32,532, to Sonerud, which discloses a clamp-like device connected to the bucket of an excavator for gripping a pipe and moving it to a desired location.

There have also been proposed seat handling fixtures, for example, U.S. Pat. No. 4,797,059, to Karg et al., which discloses an apparatus and a method for the placing of seats in a vehicle body or cab structure, typically during assembly of the vehicle. The Karg et al. reference discloses the use of a "C" frame suspended from an overhead lifting device. The "C" frame of the Karg et al. reference is utilized to place the seat within the vehicle from an opening in the side of the vehicle and is not designed to manipulate the seat, such as to invert or flip the seat over.

However, there are still many situations where workers must expend much energy in repetitively lifting heavy objects and be continuously subjected to potential risk and injury. An example of such a situation is the manufacture and installation of seats and in particular automobile seats.

Automobile seats typically are relatively very heavy. Such seats weigh anywhere from fifty to several hundred or more pounds, depending upon the particular type of seat and whether any additional features have been added to the seat. Current trends would continue to add to the weight of such seats. With additional weight due to motors, brackets and mechanisms for fully adjustable seats and with the addition of lumbar and thigh support mechanisms including air bladders and pumps, the seats can become extremely difficult and dangerous for humans to handle.

From the above discussion, it can be readily appreciated that the prior art does not disclose a technique or the necessary equipment for manipulating a seat during the manufacturing process, in such a manner that a worker does not have to repetitively lift and manipulate the seat and be subjected to potential injury. Accordingly, what is needed is a device for the lifting and maneuvering of a seat along an assembly line once it has been manufactured, which does not require a worker to unaided lift, flip over, or rotate the seat, wherein the device can be easily, efficiently, inexpensively and safely operated.

SUMMARY OF THE INVENTION

According to the present invention there is provided a seat handling device for manipulating the position of a seat during a manufacturing process. The seat handling device of the present invention includes an inverted "L" shaped bar having a first end of the bar suspended from an overhead cable which is connected to a motor and a second end depending downward from the first end and having connected to a first side thereof a handle bar for moving the seat handling device, a rotor connected to an opposite side of the second end of the bar and a first blade having a first portion projecting substantially perpendicular to the second end of the bar and a second portion angularly offset from the first portion of the blade, a clamp member opposite the first blade for cooperation therewith to clamp the seat between the blade and the clamp member and a means for moving the clamp member and the blade together and apart for clamping the seat. The rotor of the seat handling device operates to flip-over the seat held by the first blade and the clamp member.

The seat handling device of the present invention is equipped with a pair of air-actuated piston-cylinders for providing the clamping action between the first blade and the clamp member. Preferably the air-actuated piston-cylinders are double-acting utilizing switches located on the handle bar connected to the "L" shaped bar.

Accordingly, it is an object of the present invention to provide a seat handling device for use by a worker and to aid the worker in lifting, manipulating and rotating a seat, such that it is not necessary for the worker to utilize but a minimum of his or her own muscle power to move and manipulate the seat during a manufacturing process.

It is another object of the present invention to provide a seat handling device utilizing a blade member which has a first portion substantially perpendicular to the direction of lifting and a second portion connected to the first portion and angularly offset a sufficient amount to prevent the blade from ripping or tearing the material of the seat yet allow for easy insertion into the bight-line of the seat to manipulated.

It is a further object of the present invention to provide a seat handling device which positively engages only the seat portion of a seat such that the entire seat can be handled without any risk of the seat falling out of the handling device until the clamp member is removed from the seat portion.

It is another object of the present invention to provide a seat handling device which utilizes a centrally located handle bar for maneuvering the device and which has a plurality of actuators located thereon for controlling the device of the present invention.

It is yet another object of the present invention to provide a seat handling device which requires a minimal amount of operator effort while manipulating a seat utilizing the device of the present invention.

It is another object of the present invention to provide a seat handling device which accomplishes the above objects which is less costly to manufacture and operate than prior known devices.

It is a further object of the present invention to provide a seat handling device which can accomplish the above stated objectives while operating only using air-actuated components.

Other objects and advantages of this invention will be more apparent after a reading of the following detailed description of the preferred embodiment taken in conjunction with the drawings.

BRIEF DESCRIPTION OF THE DRAWINGS

FIG. 1 is a side elevational view of a device according to the present invention showing a phantom automobile seat in an upright position;

FIG. 2 is a front elevational view taken in the direction of the arrows 2—2 of the device in FIG. 1 with the phantom seat removed;

DETAILED DESCRIPTION OF THE PREFERRED EMBODIMENT

Figure 3:
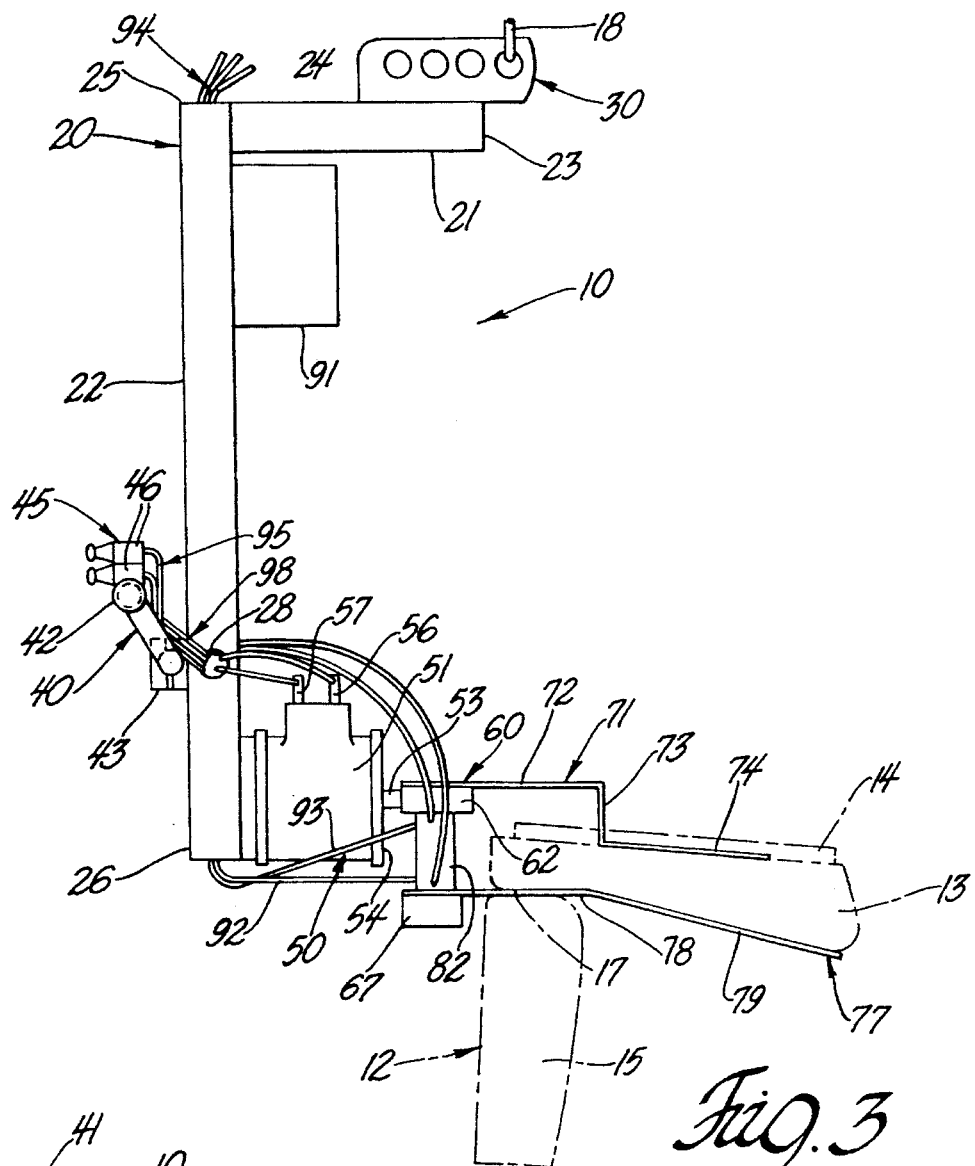
FIG. 3 is a side elevational view of the device according to the present invention showing a phantom automobile seat in an inverted position.

With reference to the attached drawings, and in particular to FIG. 1, there is shown a seat handling device 10 according to the present invention. The seat handling device 10 is designed to manipulate and maneuver a seat 12 having a seat portion 13 and back portion 15. The seat handling device 10 of the preferred embodiment of the present invention is designed to work in conjunction with the seat 12 wherein the back portion 15 and the seat portion 13 are connected together utilizing any means which provides for a bight line 17 between the back portion 15 and the seat portion 13 which is free from any obstruction. However, as discussed below, it is possible to provide for a seat handling device which may be used with a seat 12 which has a partially obstructed bight line 17.

The seat handling device 10 of the present invention consists of a bar 20, preferably "L" shaped and having a first leg or end 21 and a second leg or end 22, a bracket 30 for connecting the bar 20 to a cable 18, a motor (not pictured) for lifting and lowering the seat handling device 10 through the cable 18, a rotor 50 and a clamping mechanism or member 60.

The bar 20 is preferably manufactured out of stock one inch square steel tubing. In the preferred manufacturing method, the first leg 21 and second leg 22 are cut to length and then an end 24 of the first leg 21 is welded to an end 25 of the second leg 22 to form the "L" shaped bar 20 as best shown in FIG. 1. In order to achieve a desirable balance for the seat handling device 10, it is desirable for the first leg 21 to have a length which is shorter than the length of the second leg 22 such that the device 10 is balanced when it has the seat 12 loaded thereon. The bar 20 is preferably made out of hollow stock so it is possible to route the air hoses, used for actuating the seat handling device 10, within the bar 20 to protect the hoses and to provide an aesthetically pleasing design as described more fully below.

The bar 20 is suspended from the cable 18 utilizing a hook 19 connected to the bracket 30. The hook 19 is preferably of the closure type such that the seat handling device 10 cannot become unhooked therefrom without intentional operator interaction. The bracket 30 is preferably made out of steel or a very strong alloy and is welded to an end 23 of the first leg 21 of the bar 20. In order to obtain an appropriate balance of the seat handling device 10, the bracket 30 is welded to have a portion thereof overhang the end 23 of the first leg 21 of the bar 20. The bracket 30 can be manufactured using any known process such as stamping or casting.

Multiple holes 31 are provided preferably horizontally across the bracket, in order to adjust the balance of the seat handling device 10. The specific hole 31 chosen is determined depending upon the weight of the seat 12 to be lifted. The bracket 30 has a first end 32 and a second end 33. The hook 19 is connected to the bracket 30 within one of the holes 31. The particular hole 31 chosen is such that for heavier seats 12, the hole 31 closer to the first end 32 of the bracket 30 is chosen, and for lighter seats 12, the hole 31 closer to the second end 33 of the bracket 30 will be chosen in order to obtain a good balance of the seat handling device 10 during operation. This is important for several reasons. First, good overall balance of the seat handling device 10 makes operation much easier and less fatiguing for the operator. Second, it provides for much safer operation of the seat handling device 10 by protecting against unnecessary forces acting to make the seat 12 become free from the seat handling device 10.

Figure 4:
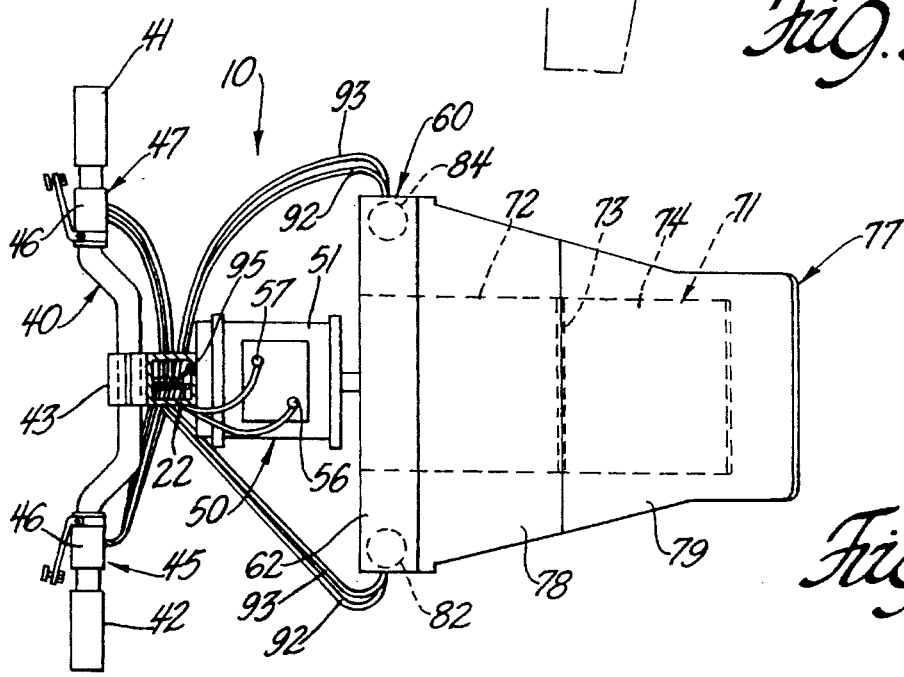
FIG. 4 is a partial cross-sectional view taken in the direction of the arrow 4—4 of the device in FIG. 1 with the phantom seat removed.

The seat handling device 10 of the present invention is provided with a handle bar 40 similar to a handle bar on a bicycle. The handle bar 40 is connected to the second leg 22 of the bar 20 at a position between the ends 25 and 26 thereof, but preferably closer to the end 26. The handle bar 40 is connected to the second leg 22 using a clamp 43, which is similar to a goose neck of a bicycle, however it is possible to use any known type of clamp for connecting the handle bar 40 to the second leg 22 of the bar 20. As best shown in FIGS. 2 and 4, the handle bar 40 preferably has a pair of grips 41 and 42 connected to the ends of the handle bar 40 which are comfortable and durable for use by the operator. The handle bar 40 is connected to the second leg 22 at a position which is optimal for controlling the seat handling device 10 and which will allow the operator to maintain his or her arms in a comfortable position while providing a good overall balance to the seat handling device 10.

The handle bar 40 has connected thereto and located proximate the grips 41 and 42, a first and a second set of actuators 47 and 45, respectively, for controlling the pneumatics connected to the seat handling device 10 to control different functions of the device, as more fully described below. The first and second set of actuators 47 and 45 each include a plurality of actuators 46. Each actuator 46 is preferably a three-way valve which can be used in a normally closed or a normally open position, as is well known in the industry. An actuator 46 which is normally closed is preferably finger controlled by the operator between a first position in which the valve is closed and a second position in which the valve is open and applies the higher-pressure air to the connected part of the device to perform a certain manipulation. An example of such an actuator is the AIRMITE, Model No. MV2-G Fingertip Lever. It is also possible to color code the actuators 46 to group the actuators which control a particular movement of the seat handling device 10 as is also well known in the art. It is possible to use nearly any particular arrangement for the actuators 46 in the first and second sets of actuators 47 and 45, respectively. It is preferable to have the actuators 46 grouped such that the actuators which control the same function, but in opposite directions, are located next to each other.

The seat handling device 10 of the present invention is also preferably provided with a manifold 90 located in a box 91 which is connected near the end 25 of the second leg 22 underneath the first leg 21. The box 91 may be connected either to the second leg 22 or the first leg 21 using any known attachment means such as any type of connector or by using any known welding technique. Since in the preferred embodiment the box 91 is made out of steel, it is preferably welded to the second leg 22 in a position which will not interfere with the operation of the seat handling device in maneuvering the seat 12.

The components of the device which are used for performing the maneuvering of the seat 12 are preferably air-actuated. It also is possible to use hydraulics or electronics (in the form of servos and switches) for maneuvering the seat 12, however, these methods for maneuvering are not as clean and safe as using air. Air is supplied to the seat handling device 10 from a high-pressure source, such as shop air, on the order of anywhere between 40 and 200 p.s.i. The components of the preferred embodiment are intended to be used with standard shop air. If higher pressure air is supplied, it is possible to simply put a regulator in line before the air is supplied to the device which lowers the air pressure in the lines to a point at which the components of the device will work.

The air is delivered to the seat handling device 10 via supply lines 94 which are preferably neatly run down the cable 18 and enter the second leg 22 at the end 25 where the supply lines 94 will be protected. It is possible to have a single supply line 94, but it is preferable to have two or more supply lines 94 which control different functions so that if a single supply line 94 is cut, not all functions will be lost. The supply lines 94 pass through a hole 27 in the second leg 22 to enter the box 91 to connect to the manifold 90. The manifold 90 is located within the box 91 such that the supply lines 94 are connected to a first side or inlet 96 of the manifold 90. The manifold 90 may be of any known type which can take a supply line 94, or multiple supply lines 94, and distribute the high pressure air to be supplied to the components of the seat handling device 10 to the outlets of the manifold.

The manifold 90 distributes, on a second side or outlet 97, the higher pressure air from the supply lines 94 to intermediary lines 95 which interconnect the manifold 90 with each of the actuators 46. Accordingly, each actuator 46 has its own intermediary line 95 connected to an input port (not pictured). Since the actuators 46 are in a normally-closed position, the higher-pressure air supplied to the actuators 46, via the supply lines 94, the manifold 90 and the intermediary lines 95, is not conveyed past the actuators to operate the seat handling device 10, as described below, until the operator activates a particular actuator 46 to perform a specific maneuver of the seat 12.

The intermediary lines 95 also pass through the hole 27 in the second leg 22 of the bar 20 down from the area of the box and through the second leg 22 and out a hole 28 located near the handle bar 40 near the end 26 of the second leg 22. The intermediary lines 95 are each connected to an actuator 46. Each actuator has a respective actuator line 98 which interconnects the actuator 46 with the respective component. The actuator lines 98 are preferably neatly run along the handle bar 40 and back into the hole 28 of the second leg 22 where they are appropriately arranged to run to their respective components. However, it is possible to run the actuator lines 98 outside of the second leg 22 or along any other path, in any possible manner so long as the actuator lines 98 are kept free from kinks, sharp bends, or other foreign objects which may damage them.

The actuator lines 98 are used to activate the rotor 50 and the clamping mechanism 60. The rotor 50 is composed of a main housing 51, a base 52 which is connected to the end 26 of the second leg 22 of the bar 20 and a spindle or shaft 53 which extends from an end 54 of the rotor 50. The rotor is designed to have the shaft 53 rotate in a clockwise and a counterclockwise manner with respect to an operator standing at the handle bar 40. The rotor 50 has a first connection 56 and a second connection 57 for activating the shaft 53 to rotate in the clockwise and counterclockwise directions.

The first and second connections 56 and 57 each have an actuator line 98 connected thereto for delivering high pressure air to the rotor 50. The rotor 50 is operated such that when the appropriate actuator 46 is pressed by the operator the high pressure air is supplied to the first connection 56, for example, which causes the shaft 53 of the rotor 50 to rotate in the clockwise direction. Similarly, when an appropriate actuator 46 is pressed by the operator, high pressure air is supplied to the second connection 57 which causes the shaft 53 of the rotor 50 to rotate in the counterclockwise direction.

The shaft 53 rotates the clamping mechanism 60, which holds the seat 12, preferably through 180° of rotation between a first, or up-side down position in which the seat 12 is inverted, and a second, or upright position in which the back portion 15 is vertically upward. It is possible to have the rotor 50 designed such that, by activating the actuator 46, the shaft 53 continuously rotates through more than 180° of rotation, however, this is not advisable. Instead, it is preferable to have the shaft 53 stop rotating once it has rotated through its 180° of rotation. This is done by using a rotor 50 which has a stop (not pictured) on the shaft 53 within the housing 51 which prevents the shaft 53 from rotating past the first or second position. A relief valve (not pictured) is built into the rotor 50 on both sides (meaning both connections 56 and 57) so that when the shaft 53 stops rotating, the high pressure air is allowed to escape to atmosphere. Additionally, the rotor 50 is designed so that once the shaft 53 reaches either the first or second position, the shaft 53 stops rotating and cannot rotate to the other position until the respective actuator 46 is activated by the operator. This provides for a positively controlled, safer system.

Additionally, the rotor 50 is preferably designed such that once the operator activates one of the actuators 46 to cause the shaft 53 to rotate, the shaft 53 is made to rotate through the entire 180° of rotation such that the seat cannot be left in a non-upright or non-inverted position. This also helps to make the system of the present invention safer. Thus, when the operator activates the respective actuator 46 to make the shaft 53 rotate in the opposite direction, the shaft 53 is again made to rotate through the entire 180° of rotation.

It should also be noted that in both the first and second positions, it is preferable that the seat portion 13 be as level or horizontally even as possible so that the shaft 53 of the rotor 50 is as close to horizontal as possible during the rotation of the seat 12. This helps to prevent adverse forces from acting on the weight of the seat 12 to ensure that the seat 12 does not become disengaged from the clamping mechanism 60.

The clamping mechanism 60 of the present invention is preferably particularly designed to hold as many different sizes and types of seats 12 as possible in order to provide as much standardization as possible. The clamping mechanism 60 is composed of several key components, in particular, a first blade 71, a second blade 77, and first and second pneumatic cylinders 82 and 84 for controlling the distance between the first blade 71 and second blade 77. The first blade 71 has a first portion 72 which is connected to a first base 62 and extends from the first base 62 in a substantially perpendicular direction such that the first blade 71 clears the bottom of the seat 12 when the second blade 77 is inserted into the bight line 17 between the seat portion 13 and the back portion 15, as described below.

The first blade 71 further has a second portion 74 and a riser portion 73 between the first portion 72 and the second portion 74. The riser portion 73 is designed such that there is enough distance between the first portion 72 and the seat portion 13 of the seat 12 to accommodate motors (not pictured) or other components attached to the bottom of the seat portion 13 during the assembly process, yet permit the second portion 74 to contact the bottom of the seat portion 13 of the seat 12 to clamp it in spot between the first blade 71 and the second blade 77. The second portion 74 is preferably designed to fit between rails 14 of the seat 12 and to conform as close as possible to the bottom of the seat 12 so that the clamping mechanism 60 can maintain a formidable grip on the seat portion 13 of the seat 12.

The second blade 77 is preferably designed to prevent damage to the seat 12 yet accommodate a large variety of types of seats. Accordingly, the second blade 77 has a bight portion 78 and an angled portion 79. The bight portion 78 of the second blade 77 preferably extends horizontally out from a second base 67 and is located within the bight line 17 of the seat 12 when in the clamped position. The angled portion 79 of the second blade 77 is angularly offset from the bight portion 78 to prevent tearing of the material of the seat 12 after the angled portion 79 of the second blade 77 has been inserted past the bight line 17. The angled portion 79 is angularly offset from the bight portion 78 by an angle of between 5 and 40 degrees. Preferably, the angle is approximately 20 degrees angularly offset from the bight portion 78. This angle provides enough offset such that there is little possibility of tearing the material of the seat 12. Additionally, with such a preferred angle, the second blade 77 is still appropriately positioned so that the clamping force between the first and second blades 71 and 77, respectively, is distributed over the entirety of the blades. This provides for a well balanced clamping mechanism 60 which securely holds the seat 12 with minimal possibility of the seat 12 becoming dislodged while the clamping mechanism 60 is closed.

The first cylinder 82 and second cylinder 84 are provided for opening and closing the clamping mechanism 60. The first and second cylinders 82 and 84 are connected between the first base 62 and the second base 67 such that the rod (not pictured) of each cylinder is connected to either the first base 62 or preferably the second base 67. Thus, when the first and second cylinders 82 and 84, respectively, are activated by the operator using one of the actuators 46, both cylinders open and close in unison. It is preferable that the first and second cylinders 82 and 84, respectively, be designed to be identical to provide an even and efficient movement to the opening and closing of the clamping mechanism 60. Preferably, the cylinders are chosen to be pneumatic cylinders which operate using the same air supplied to the other parts of the seat handling device 10. The air is supplied to the first and second cylinders 82 and 84 from tubes 92 and 93. Both the first cylinder 82 and the second cylinder 84 each have a tube 92 and 93 connected thereto. This is because, preferably, both of the first and second cylinders 82 and 84 are double-acting, positively controlled in both the closing and the opening directions. However, it is possible to have a single acting cylinder and biasing means combination as opposed to the double acting piston-cylinders of the preferred embodiment.

Accordingly, in operation, the seat handling device 10 of the present invention performs all necessary tasks for lifting, manipulating and handling a seat 12, such that an operator need use only a minimal amount of effort and may avoid unnecessary, repetitive, heavy lifting. As noted above, the seat handling device of the present invention is particularly well suited for use in assembly and automotive plants.

With the seat handling device 10 of the present invention installed in a plant, an operator holds the grips 41 and 42 of the handle bar 40 connected to the bar 20 and uses the appropriate actuator 46 to open the clamping mechanism 60. The operator also uses an appropriate actuator 46 to activate the rotor 50 to position the clamping mechanism 60 in the correct orientation for insertion of the second blade 77 in the bight line 17 of the seat 12. The operator adjusts the level of the seat handling device 10 so that when the handle bar 40 is pushed forward to make the angled portion 79 of the second blade 77 nearly horizontal, it is in the appropriate position to be inserted in the bight line 17 of the seat 12 and the first blade 71 is well above the bottom of the seat portion 13 of the seat 12. At the same time the operator aligns the first and second blades 71 and 77 in the middle of the seat 12, such that the second portion 74 of the first blade 71 will be aligned between any rails 14 on the seat 12.

The operator then pushes the seat handling device 10 further into the seat 12 and may preferably lift the entire seat handling device 10 an amount such that the bight portion 78 of the second blade 77 is again nearly horizontal and the angled portion 79 of the second blade 77 is now angularly offset from the horizontal such that the material of the seat 12 will not be harmed. Once the second blade 77 is inserted the appropriate amount, the operator activates the appropriate actuator 46 to close the clamping mechanism 60. Next, the seat handling device 10 is lifted so that the seat 12 is clear from any fixture or other objects and the operator then activates the rotor 50 causing the seat 12 to move into an upright position. At this point the operator moves the seat handling device 10 to the desired location, the seat 12 is set down, the clamping mechanism is opened and the first and second blades 71 and 77, respectively, are withdrawn from the seat 12. The operator may now reset the seat handling device 10 of the present invention and repeat the above process as desired.

In view of the above, it can be seen that the seat handling device 10 of the present invention provides a significant advantage over the known prior art in that it allows an operator, during manufacture of the seat, to pick-up and manipulate a seat 12 without expending a significant amount of effort. This helps to prevent injuries to the operator due to repetitive and heavy lifting. Furthermore, the clamping mechanism 60 of the present invention is designed to operate with a seat 12 having a bight line 17 such that there is a significant improvement in preventing damage to the seat 12 and there is a very low likelihood of the seat 12 escaping therefrom. Accordingly, it should be appreciated by one skilled in the art that the above described preferred embodiment is but one example of the present invention and that modifications can be made without departing from the scope of the invention, which is limited solely by the following claims.

What is claimed is:

1. A seat handling device for manipulating a position of a seat having a back portion and a seat portion, said seat handling device comprising:

an L-shaped bar having a first leg and a second leg;

a handle bar connected to said second leg of said L-shaped bar for use by an operator of said seat handling device;

means for suspending said seat handling device connected to said first leg of said L-shaped bar, said suspending means being operable to lift and lower said seat handling device by said operator;

a rotor having an output shaft, said rotor connected to said second leg of said L-shaped bar for rotating said seat; and a clamping mechanism connected to said shaft of said rotor for clamping said seat portion of said seat, said clamping mechanism comprising:

a first base;

a first blade connected to said first base and having a first portion extending substantially horizontal therefrom and a second portion vertically offset from said first portion;

a second base spaced from said first base;

a second blade connected to said second base and having a first planar portion extending substantially horizontal from said second base and a second planar portion angularly offset from said first planar portion of said second blade; and means interconnecting said first base and said second base for moving said first blade and said second blade together to clamp said seat portion of said seat therebetween;

whereby said seat handling device is operable to be inserted in said seat to clamp said seat portion and lift, invert and lower said seat to prevent said operator from doing so manually.

2. The seat handling device of claim 1 further comprising:

a manifold connected to said second leg of said L-shaped bar between said handle bar and said first leg of said L-shaped bar for distributing air supplied to said seat handling device from an external source; and a plurality of actuators connected to said handle bar for use by said operator for selectively activating said rotor and said moving means of said clamping mechanism.

3. The seat handling device of claim 2 wherein said moving means comprises:

a first piston-cylinder interconnecting said first base and said second base and connected to a first actuator of said plurality of actuators; and a second piston-cylinder interconnecting said first base and said second base and spaced from said first piston-cylinder, said second piston-cylinder being connected to a second actuator of said plurality of actuators;

wherein said first and said second piston-cylinders of said clamping mechanism selectively move said second blade with respect to said first blade between a first open position in which said seat is not clamped by said clamping mechanism and a second closed position in which said seat is securely clamped between said first blade and said second blade.

4. The seat handling device of claim 1 wherein said moving means comprises:

a first piston-cylinder interconnecting said first base and said second base; and a second piston-cylinder interconnecting said first base and said second base and spaced from said first piston-cylinder;

wherein said first and said second piston-cylinders of said clamping mechanism selectively move said second blade with respect to said first blade between a first open position in which said seat is not clamped by said clamping mechanism and a second closed position in which said seat is securely clamped between said first blade and said second blade.

5. The seat handling device of claim 1 wherein said suspending means further comprises:

a bracket having a plurality of holes aligned therein, said bracket being connected to an end of said first leg of said L-shaped bar;

means for lifting and lowering said seat handling device, said means for lifting located proximate said seat handling device and;

a cable having a first end connected to said lifting and lowering means and a second end connected to said bracket.

6. The seat handling device of claim 1 wherein said rotor is indexed to rotate through 180 degrees of rotation.

* * * * *